United States Patent
Toyoda et al.

(10) Patent No.: US 8,432,516 B2
(45) Date of Patent: Apr. 30, 2013

(54) RESIN COMPOSITION AND IMAGE DISPLAY DEVICE

(75) Inventors: Tomoyuki Toyoda, Tochigi (JP); Yoshihisa Shinya, Tochigi (JP); Yusuke Kamata, Tochigi (JP)

(73) Assignee: Sony Chemical & Information Device Corporation, Tokyo (JP)

( * ) Notice: Subject to any disclaimer, the term of this patent is extended or adjusted under 35 U.S.C. 154(b) by 343 days.

(21) Appl. No.: 12/452,329

(22) PCT Filed: Jul. 16, 2008

(86) PCT No.: PCT/JP2008/062791
§ 371 (c)(1),
(2), (4) Date: Dec. 24, 2009

(87) PCT Pub. No.: WO2009/011353
PCT Pub. Date: Jan. 22, 2009

(65) Prior Publication Data
US 2010/0118245 A1    May 13, 2010

(30) Foreign Application Priority Data

Jul. 17, 2007  (JP) ................................. 2007-186360
Jan. 11, 2008  (JP) ................................. 2008-005027
Apr. 14, 2008  (JP) ................................. 2008-105198

(51) Int. Cl.
*G02F 1/1333*    (2006.01)

(52) U.S. Cl.
USPC ........................................................ 349/122

(58) Field of Classification Search ........................ None
See application file for complete search history.

(56) References Cited

U.S. PATENT DOCUMENTS

| 4,679,918 | A  | 7/1987  | Ace |
| 5,126,620 | A  | 6/1992  | Haraga et al. |
| 6,414,781 | B1 | 7/2002  | Saitoh |
| 6,461,709 | B1 | 10/2002 | Janssen et al. |

(Continued)

FOREIGN PATENT DOCUMENTS

| EP | 0 789 295 A1 | 8/1997 |
| EP | 1634910 A1 * | 3/2006 |

(Continued)

OTHER PUBLICATIONS

Japanese Office Action issued in Application No. 2008-98342; Dated Jul. 6, 2011 (With Translation).

(Continued)

*Primary Examiner* — Thanh-Nhan P Nguyen
(74) *Attorney, Agent, or Firm* — Oliff & Berridge, PLC (57) ABSTRACT

An image display device has an image display part and a protective part on the image display part. The image display device suppresses image unevenness and cured resin peeling caused by internal stress generated due to curing shrinkage of a cured resin between the protective part and the image display part or external stress applied on the image display part due to warping of the protective part. A cured resin layer is arranged between the image display part and the protective part. The cured resin layer has a light transmittance in the visible region of 90% or more, an elongation ratio of 700% or more at 25° C. and 400% or more at 80° C., and an adhesive force with respect to the protective part of 0.4 N/cm or more at 25° C. and 0.3 N/cm or more at 80° C.

20 Claims, 2 Drawing Sheets

U.S. PATENT DOCUMENTS

| | | | |
|---|---|---|---|
| 6,950,236 B2 * | 9/2005 | Hokazono et al. | 359/586 |
| 7,982,826 B2 | 7/2011 | Hirakata et al. | |
| 2002/0131141 A1 | 9/2002 | Saitoh | |
| 2002/0154254 A1 | 10/2002 | Tasaki et al. | |
| 2003/0087054 A1 * | 5/2003 | Janssen et al. | 428/40.1 |
| 2004/0180148 A1 | 9/2004 | Hieda et al. | |
| 2005/0249932 A1 | 11/2005 | Wang et al. | |
| 2006/0062938 A1 * | 3/2006 | Takeko et al. | 428/1.55 |
| 2006/0110549 A1 | 5/2006 | Wang et al. | |
| 2006/0159867 A1 | 7/2006 | O'Donnell | |
| 2007/0065091 A1 | 3/2007 | Hinata et al. | |
| 2007/0141244 A1 | 6/2007 | Bell et al. | |
| 2009/0128767 A1 | 5/2009 | Suezaki et al. | |
| 2009/0283211 A1 | 11/2009 | Matsuhira | |
| 2009/0296033 A1 | 12/2009 | Shinya et al. | |

FOREIGN PATENT DOCUMENTS

| | | |
|---|---|---|
| JP | A-02-165188 | 6/1990 |
| JP | A-03-204616 | 9/1991 |
| JP | A-06-299126 | 10/1994 |
| JP | A-06-337411 | 12/1994 |
| JP | A-07-013173 | 1/1995 |
| JP | A 7-64282 | 3/1995 |
| JP | A-08-122759 | 5/1996 |
| JP | A-08-211353 | 8/1996 |
| JP | A-08-220554 | 8/1996 |
| JP | A-08-328023 | 12/1996 |
| JP | A-09-087593 | 3/1997 |
| JP | A-09-259770 | 10/1997 |
| JP | A-09-274536 | 10/1997 |
| JP | A-09-318932 | 12/1997 |
| JP | A-10-081956 | 3/1998 |
| JP | A-10-083247 | 3/1998 |
| JP | A-10-095967 | 4/1998 |
| JP | A-10-293314 | 11/1998 |
| JP | A-2000-073025 | 3/2000 |
| JP | A-2000-258780 | 9/2000 |
| JP | A-2000-267118 | 9/2000 |
| JP | A-2000-284700 | 10/2000 |
| JP | A-2001-141907 | 5/2001 |
| JP | A-2002-019013 | 1/2002 |
| JP | A 2002-52552 | 2/2002 |
| JP | A-2002-092957 | 3/2002 |
| JP | A-2002-528298 | 9/2002 |
| JP | A-2002-323861 | 11/2002 |
| JP | A-2002-348150 | 12/2002 |
| JP | A-2002-543545 | 12/2002 |
| JP | A-2003-003150 | 1/2003 |
| JP | A-2003-029644 | 1/2003 |
| JP | A-2003-29644 | 1/2003 |
| JP | A-2003-150065 | 5/2003 |
| JP | A-2003-207790 | 7/2003 |
| JP | A-2003-295780 | 10/2003 |
| JP | A-2004-009665 | 1/2004 |
| JP | A-2004-077887 | 3/2004 |
| JP | A 2004-115757 | 4/2004 |
| JP | A-2004-117545 | 4/2004 |
| JP | A-2004-169023 | 6/2004 |
| JP | A 2004-212521 | 7/2004 |
| JP | A-2004-256595 | 9/2004 |
| JP | A-2004-271935 | 9/2004 |
| JP | A-2004-279946 | 10/2004 |
| JP | A-2004-359769 | 12/2004 |
| JP | A-2005-023315 | 1/2005 |
| JP | A-2005-055641 | 3/2005 |
| JP | A-2005-154581 | 6/2005 |
| JP | A-2005-179481 | 7/2005 |
| JP | A-2005-225127 | 8/2005 |
| JP | A-2005-234129 | 9/2005 |
| JP | A-2005-283749 | 10/2005 |
| JP | A-2005-314687 | 11/2005 |
| JP | A-2005-315901 | 11/2005 |
| JP | A-2006-011212 | 1/2006 |
| JP | A-2006-053425 | 2/2006 |
| JP | A-2006-053531 | 2/2006 |
| JP | A-2006-058753 | 3/2006 |
| JP | A-2006-150755 | 6/2006 |
| JP | A-2006-221187 | 8/2006 |
| JP | A-2006-267502 | 10/2006 |
| JP | A-2006-308866 | 11/2006 |
| JP | A-2006-342222 | 12/2006 |
| JP | A-2007-010769 | 1/2007 |
| JP | A-2007-023147 | 2/2007 |
| JP | A-2007-108592 | 4/2007 |
| JP | A-2007-114737 | 5/2007 |
| JP | A-2007-140220 | 6/2007 |
| JP | A-2007-156066 | 6/2007 |
| JP | A-2007-298667 | 11/2007 |
| JP | A-2008-507617 | 3/2008 |
| KR | A-10-2007-033920 | 3/2007 |
| TW | 567338 | 12/2003 |
| WO | WO 00/65409 A2 | 11/2000 |
| WO | WO 2006/129665 A1 | 12/2006 |
| WO | WO 2007/063751 A1 | 6/2007 |
| WO | WO 2008/007800 A1 | 1/2008 |

OTHER PUBLICATIONS

European Search Report dated Jun. 30, 2010 in European Patent Application No. 08 79 1186.3.
"Liquefied Polyisoprene Rubber LIR," Catalog issued in 2002.
Office Action issued in Japanese Application No. 2008-105198 dated May 9, 2011 (with translation).
Office Action issued in Chinese Application No. 200880024844.2 dated May 11, 2011 (with translation).
International Search Report issued in International Application No. PCT/JP2008/062791 on Oct. 21, 2008 (w/ translation).
Written Opinion of the International Search Authority issued in International Application No. PCT/JP2008/062791 on Oct. 21, 2008 (with partial English-language translation).
Japanese Office Action issued in Application No. 2008-105198; Dated Jul. 11, 2011 (With Translation).
Oct. 3, 2011 Office Action issued in Japanese Application No. 2008-98342 (with translation).
Aug. 13, 2012 Office Action issued in Japanese Patent Application No. 2008-185415 (with translation).
Sep. 20, 2012 Office Action issued in Taiwanese Patent Application No. 097127147; with English-language translation.
Aug. 31, 2012 Office Action in Korean Patent Application No. 2010-7000882 (with translation).
Sep. 14, 2012 Office Action issued in U.S. Appl. No. 12/452,275.
Mar. 21, 2012 Japanese Office Action issued in JP-2008-185415 (with Translation).
Feb. 20, 2012 Submission of Publications and the like submitted in Japanese Patent Application No. 2008-101101 (with translation).
Feb. 20, 2012 Submission of Publications and the like submitted in Japanese Patent Application No. 2008-100891 (with translation).
Feb. 24, 2012 Office Action issued in Taiwanese Patent Application No. 97127147 (with translation).
Apr. 5, 2012 Office Action issued in Chinese Patent Application No. 200880024815.6 (with translation).
Oct. 21, 2011 Office Action issued in Korean Patent Application No. 2010-7000882 (with translation).
Aug. 19, 2008 International Search Report issued in International Patent Application No. PCT/JP2008/062866 (with translation).
Jun. 22, 2010 Extended European Search Report issued in European Patent Application No. 08778217.3.
Submission of Publications and the like submitted in Japanese Patent Application No. 2008-105198 dated Dec. 13, 2011 (with translation).
Submission of Publications and the like submitted in Japanese Patent Application No. 2008-101101 dated Dec. 30, 2011 (with translation).
Submission of Publications and the like submitted in Japanese Patent Application No. 2008-100891 dated Dec. 30, 2011 (with translation).
Submission of Publications and the like submitted in Japanese Patent Application No. 2008-98342 dated Jan. 13, 2012 (with translation).
Japanese Patent Application No. 2007-186360 dated Jul. 17, 2007 (with partial translation).
Japanese Patent Application No. 2008-005027 dated Jan. 11, 2008 (with partial translation).
Japanese Patent Application No. 2007-102252 dated Apr. 9, 2007.
Japanese Patent Application No. 2006-193730 dated Jul. 14, 2006.
Japanese Patent Application No. 2007-102251 dated Apr. 9, 2007.

Aug. 6, 2008 Notification of Reasons for Refusal in Japanese Patent Application No. Hei 11-038529.
Dec. 26, 2008 Notification of Reasons for Refusal in Japanese Patent Application No. Hei 11-038529.
May 18, 2009 Decision of Refusal in Japanese Patent Application No. Hei 11-038529.
Oct. 16, 2009 Preliminary report in Japanese Patent Application No. Hei 11-038529.
The committee of kagaku daijiten, eds., "Kagaku Daijiten 2," p. 375, Kyoritsu Shuppan Co., Ltd. Jul. 15, 2006.
Akira Matsumura, ed., "Daijirin," p. 449, Sanseido Publishing Co., Ltd., Nov. 3, 1988.
The Committee of Shogakukan Daijisen, eds., "Daijisen," p. 492, Shogakukan Inc., Dec. 1, 1995.
Feb. 29, 2012 Office Action issued in Japanese Patent Application No. 2008-105198 (with translation).
May 11, 2011 Office Action issued in Chinese Application No. 200880024844.2 (with translation).
Jun. 30, 2010 European Search Report issued in European Patent Application No. 08 79 1186.3.
Jan. 17, 2010 Written Opinion of the International Search Authority issued in International Application No. PCT/JP2008/062791 (with translation).
Jan. 14, 2009 Written Opinion of the International Searching Authority issued in International Application No. PCT/JP2007/064120 (with translation).
U.S. Appl. No. 12/452,275 in the name of Toyoda et al.
May 11, 2012 Examination Report in Taiwanese Patent Application No. 97127146 w/English-language Translation.
Jun. 20, 2012 Japanese Office Action issued in JP-2008-098342 (with English-language Translation).
Jul. 4, 2012 Trial Decision of Japanese Patent Application No. 11-38529 (Dissatisfaction No. 2009-14917).
Oct. 22, 2012 "Submission of Publications and the like" filed in Japanese Patent Application No. 2008-98342 (with translation).
The Notification of Reasons for Refusal for Japanese Patent Application No. 10-240922, completed May 13, 2008.
Oct. 24, 2012 "Submission of Publications and the like" filed in Japanese Patent Application No. 2008-105198; with English-language translation.
Mar. 21, 2012 Japanese Office Action issued in Japanese Patent Application No. 2012-048220 (with Translation).
Mar. 21, 2012 Japanese Office Action issued in Japanese Patent Application No. 2008-096150 (with Translation).
Jul. 18, 2012 Extended European Search Report issued in European Patent Application No. 11009604.7.
Jul. 13, 2012 Korean Office Action issued in Korean Patent Application No. 2012-7007367 (with translation).
Nov. 30, 2012 Office Action issued in Chinese Patent Application No. 200880024815.6 (with translation).
Nov. 16, 2012 Submission of Publications and the like issued in Japanese Application No. 2008-100891.
Dec. 26, 2012 Notification of Reason(s) for Refusal issued in Japanese Application No. 2008-105198; with translation.
Dec. 26, 2012 Notification of Reason(s) for Refusal issued in Japanese Application No. 2012-105372; with translation.
Dec. 7, 2012 Submission of Publications and the like issued in Japanese Patent Application No. 2008-098342; with translation.
Feb. 20, 2013 Notification of Reason(s) for Refusal issued in Japanese Patent Application No. 2008-098342; with English-language translation.

* cited by examiner

RESIN COMPOSITION AND IMAGE DISPLAY DEVICE

TECHNICAL FIELD

The present invention relates to an image display device such as a liquid crystal display (LCD) device used, for example, in a cellular phone. In particular, the present invention relates to an image display device provided with a transparent protective part arranged on an image display part, in which a cured resin is arranged between the image display part and the protective part.

BACKGROUND ART

Figure 4:
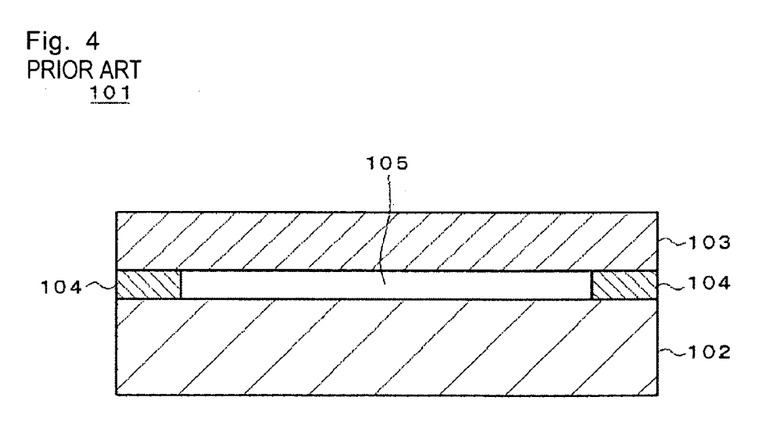
FIG. 4 is a cross-sectional view illustrating the main part of a display device according to the conventional art.

Conventionally, as this type of display device, a liquid crystal display device 101 like that illustrated in FIG. 4, for example, is known. This liquid crystal display device 101 is provided with a transparent protective part 103 made of, for example, glass or plastic on a liquid crystal display panel 102, which is the image display part.

In this display device, to protect the surface of the liquid crystal display panel 102 and a polarizing plate (not shown), a spacer 104 is arranged between the liquid crystal display panel 102 and the protective part 103 to form a gap 105 between the liquid crystal display panel 102 and the protective part 103.

However, the gap 105 present between the liquid crystal display panel 102 and the protective part 103 causes light scattering, resulting in decreased contrast and brightness. The presence of the gap 105 also makes it difficult to produce a thinner display device.

In view of the above problem, it has been proposed to fill the gap between the liquid crystal display panel and the protective part with a resin having a high visible light transmittance (Patent Document 1).
[Patent Document 1] Japanese Patent Application Laid-Open No. 2005-55641

DISCLOSURE OF THE INVENTION

Problems to be Solved by the Invention

However, due to the internal stress generated in the cured resin during curing shrinkage of the filled resin, or the external stress applied on the liquid crystal panel via the cured resin when warping occurs in the protective part due to fluctuations in the environment temperature, deformation occurs in the optical glass plates sandwiching the liquid crystals of the liquid crystal display panel. This leads to the loss of in-plane uniformity of the liquid crystal cell gap and disruption of the orientation of the liquid crystal material. Consequently, the chances of image defects, such as image unevenness, occurring increases. In particular, when a resin plate which can be formed thinner than a glass plate is used as the protective part 103, the effects of warping due to fluctuations in the environment temperature increase, which can lead to further harm of the in-plane uniformity, and worsening of image unevenness. Moreover, if a protective part 103 made of a plastic plate excessively warps, the cured resin between the plastic plate and the liquid crystal display panel cannot follow the warping of the plastic plate, which can cause the cured resin to peel away from the plastic plate.

The present invention is directed to solving the problems in the conventional art. It is an object of the present invention to provide an image display device which suppresses image unevenness and cured resin peeling caused by internal stress generated due to curing shrinkage of a resin composition between a protective part and an image display part or external stress applied on the image display part due to warping of the protective part. Furthermore, it is an object of the present invention to provide a resin composition which provides such a cured resin.

Means for Solving the Problems

The present inventors discovered that the above-described objects could be achieved with a cured resin formed by filling a resin composition in a gap between an image display part and a protective part and then curing, by adjusting the elongation ratio of the cured resin and the adhesive force of the cured resin with respect to the protective part, thereby completing the image display device according to the present invention. Furthermore, the present inventors completed the resin composition according to the present invention for filling between the image display part and the protective part, based on the fact that, for a pre-cured resin composition of the cured resin, the internal stress which builds up during curing of the resin composition can be adjusted by defining the post-curing elongation ratio and adhesive force with respect to the protective part.

Specifically, the present invention provides an image display device, comprising an image display part and a light-transmitting protective part arranged on the image display part, wherein
the image display device further comprises a cured resin layer arranged between the image display part and the protective part, and
the cured resin layer has a light transmittance in a visible region of 90% or more, an elongation ratio of 700% or more at 25° C. and 400% or more at 80° C., and an adhesive force with respect to the protective part of 0.4 N/cm or more at 25° C. and 0.3 N/cm or more at 80° C.

Furthermore, the present invention provides a resin composition for forming a cured resin layer to be arranged between an image display part and a light-transmitting protective part of an image display device, wherein a cured resin obtained by curing the resin composition has a light transmittance in a visible region of 90% or more for a thickness of 100 μm, an elongation ratio of 700% or more at 25° C. and 400% or more at 80° C., and an adhesive force with respect to an acrylic resin plate of 0.4 N/cm or more at 25° C. and 0.3 N/cm or more at 80° C.

In addition, the present invention provides a cured resin layer to be arranged between an image display part and a light-transmitting protective part of an image display device, wherein the cured resin layer has a light transmittance in a visible region of 90% or more, an elongation ratio of 700% or more at 25° C. and 400% or more at 80° C., and an adhesive force with respect to an acrylic resin plate of 0.4 N/cm or more at 25° C. and 0.3 N/cm or more at 80° C.

Effects of the Invention

According to the image display device of the present invention, the cured resin which is present between the image display part and the protective part has an elongation ratio and an adhesive force with respect to the protective part which are of a specific value or more. Thus, the internal stress generated due to curing shrinkage of the cured resin is reduced, and the cured resin can follow the warping of the protective part. Consequently, image defects and peeling of the cured resin away from the protective part can be greatly suppressed.

Furthermore, according to the resin composition of the present invention, the cured resin of such resin composition has an elongation ratio and an adhesive force with respect to the protective part which are defined to be specific values or more. In a more preferred embodiment, a curing shrinkage ratio is defined to be a specific value or less. Therefore, when the resin composition is filled between the image display part and the protective part and cured, the internal stress generated due to the curing shrinkage of the cured resin is reduced, the cured resin can follow the warping of the protective part, and image defects and peeling of the cured resin away from the protective part can be greatly suppressed. Furthermore, the refractive index of the resin composition according to the present invention can be adjusted to a value closer to the refractive index of a structural panel of the image display part or the structural panel of the protective part than the refractive index of the gap which is provided between a conventional liquid crystal display panel and a protective part. This adjustment can be carried out based on the selection of the components or adjustment of the used amounts. In such a case, the reflection of light at the interface between the protective part and the cured resin or the interface between the cured resin and the image display part can be suppressed. Consequently, according to the image display device of the present invention, a high-brightness and high-contrast display which is free from image defects can be provided.

In particular, when the image display part is a liquid crystal display panel, a high-quality display can be achieved by reliably preventing image defects such as disrupted orientation of the liquid crystal material.

In addition, according to the image display device of the present invention, since a cured resin is arranged between the image display part and the protective part, the image display device is stronger against shocks.

Still further, the image display device according to the present invention is thinner than conventional examples, in which a gap is provided between the image display part and the protective part.

DESCRIPTION OF REFERENCE NUMERALS 1, 1B Image display device
2 Image display part
3 Protective part
4 Spacer
5 Cured resin or cured resin layer
6, 7 Polarizing plate

BEST MODE FOR CARRYING OUT THE INVENTION

A preferred embodiment of the present invention will now be described with reference to the drawings. In the drawings, the same reference numerals denote the same or like elements.

Figure 1:
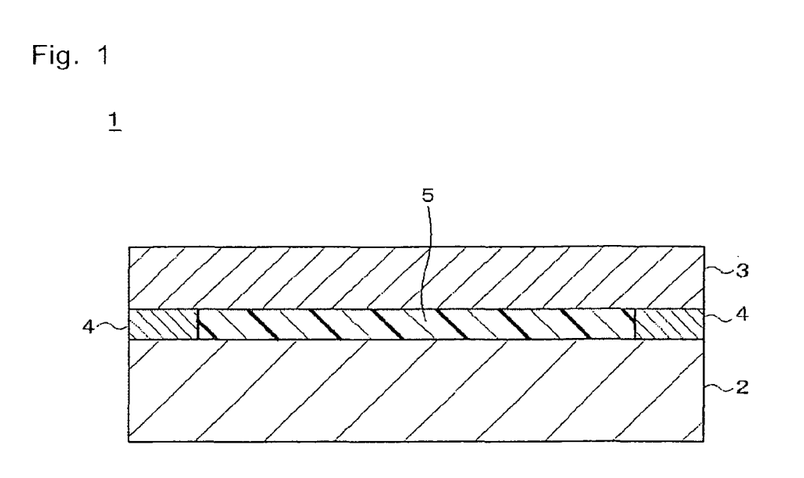
FIG. 1 is a cross-sectional view illustrating the main part of an embodiment of a display device according to the present invention.
Figure 2:
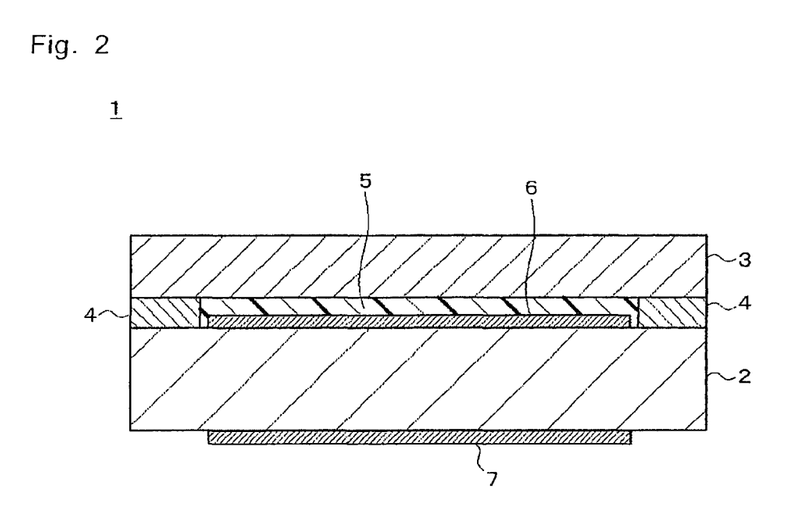
FIG. 2 is a cross-sectional view illustrating the main part of an embodiment of the display device according to the present invention.

FIGS. 1 and 2 are cross-sectional views illustrating the main parts of an embodiment of an image display device according to the present invention.

As illustrated in FIG. 1, an image display device 1 of the present embodiment includes: an image display part 2 that is connected to a driving circuit (not shown) and displays an image in a predetermined manner; and a light-transmitting protective part 3 that is arranged facing and in close proximity to the image display part 2 at a given distance.

The image display part 2 in the image display device 1 not especially limited. If the image display device 1 is a liquid crystal display device, the image display part 2 may be a liquid crystal display panel. If the image display device 1 is a plasma display device, the image display part 2 may be a plasma panel. If the image display device 1 is an organic EL display device, the image display part 2 may be an organic EL sheet. As the surface material of the image display part 2, optical glass or a plastic (acrylic resin and the like) may be preferably used.

Applications of the liquid crystal display device are not especially limited. The liquid crystal display device may be applied in various products, such as in an electronic device like a cellular phone, a portable game device and the like.

When the image display part 2 is a liquid crystal display panel, as illustrated in FIG. 2, polarizing plates 6 and 7 are provided on the both surfaces of the image display part 2.

The protective part 3 is formed from a plate-like, sheet-like, or film-like member which is about the same size as the image display part 2. As this member, it is preferred to use, for example, optical glass or a plastic (an acrylic resin such as polymethyl methacrylate (PMMA), polycarbonate and the like). An optical layer, such as an anti-reflection film, a shielding film, a viewing angle control film and the like, may also be formed on the front face or bottom face of the protective part 3. In particular, in the present invention, if an acrylic resin plate, and among those a PMMA plate, is used for the protective part 3, the advantageous effects of the present invention are remarkable.

The protective part 3 is provided on the image display part 2 via a spacer 4 which is provided on a peripheral part of the image display part 2. The thickness of this spacer 4 is about 0.05 to 1.5 mm. Such a thickness serves to keep the distance between the surfaces of the image display part 2 and the protective part 3 at approximately 1 mm.

The image display device 1 includes a cured resin layer 5 between the image display part 2 and the protective part 3.

This cured resin layer 5 has a light transmittance in the visible region of 90% or more, an elongation ratio of 700% or more at 25° C. and 400% or more at 80° C., preferably 800% or more at 25° C. and 500% or more at 80° C., and an adhesive force with respect to the protective part 3 of 0.4 N/cm or more at 25° C. and 0.3 N/cm or more at 80° C., preferably 0.5 N/cm or more at 25° C. and 0.4 N/cm or more at 80° C.

The reason why the light transmittance in the visible region is set to be 90% or more is that if the light transmittance is less than 90%, the occurrence of discoloration and the deterioration in transparency cannot be ignored in practical use. In the image display device 1, the light transmittance needs to be 90% or more regardless of the thickness of the cured resin layer 5. More specifically, when the cured resin layer 5 is formed from the same material, for a thickness of 100 μm for example, the light transmittance is 90% or more. However, if the light transmittance is 70% for a thickness of 1 mm, such a 1 mm-thick cured resin layer 5 cannot be applied in the image display device 1 of the present invention. Nevertheless, even in such a case, the cured resin layer 5 could be applied for the 100 μm thickness.

The reason why 25° C. and 80° C. were selected as the temperatures for defining the elongation ratio and adhesion is that the image display device is normally used in a 25° C. environment, and when irradiating UV rays on the resin composition during the production process, the temperature increases up to about 80° C. Furthermore, warping of the acrylic resin, such as PPMA, forming the protective part suddenly increases at about 80° C. The elongation ratio is a value obtained by producing a sample and measuring with a tension tester (Tensilon, manufactured by Orientech Co., Ltd.). The sample is produced by dropping the resin composition onto a release film to a given thickness, irradiating the resin composition with UV rays to cure, and then cutting into a given size (for example, 0.6 mm thick, 10 mm wide, 25 mm long). The conditions are an atmosphere temperature of 25° C. or 80° C., a weight of 5 Kgf, and a rate of pulling of 5 mm/min. The elongation ratio is calculated as elongation ratio (%)=$L/L_0 \times 100$, where $L_0$ is a standard length and L is a displacement length until breakage.

The reason why the elongation ratio is set to be 700% or more at 25° C. is that if the elongation ratio is less than 700%, the cured resin cannot follow the warping. Furthermore, the reason why the elongation ratio is set to be 400% or more at 80° C. is that if the elongation ratio is less than 400%, the cured resin cannot follow the warping.

The reason why the adhesive force with respect to the protective part 3 is set to be 0.4 N/cm or more at 25° C. is that if the adhesive force is less than 0.4 N/cm, the cured resin cannot follow the warping of the PMMA due to the heat generated by UV irradiation during resin curing, which causes the cured resin to peel. Furthermore, the reason why the adhesive force is set to be 0.3 N/cm or more at 80° C. is that if the adhesive force is less than 0.3 N/cm, the cured resin cannot follow the warping in the humidity resistant environment temperature of mobile devices, which causes the cured resin to peel. The adhesive force is a value measured in conformity with JIS K 6854-1.

Furthermore, for the cured resin layer 5, it is preferred to focus on the storage modulus at 25° C. This is because storage modulus depends on the residual stress during curing of the resin. Specifically, because residual stress increases and display unevenness occurs in the liquid crystals if the storage modulus at 25° C. is too high, the storage modulus is preferably $1 \times 10^6$ Pa or less, more preferably from $1 \times 10^3$ to $1 \times 10^6$ Pa, and especially preferably $1 \times 10^3$ to $1 \times 10^5$ Pa.

The refractive index of the cured resin layer 5 is determined by the relationship between the materials of the image display part 2 and the protective part 3. However, if the surface of the image display part 2 on the cured resin layer 5 side is a glass plate and the surface of the protective part 3 is an acrylic resin plate formed from polymethyl methacrylate or the like, the refractive index is preferably 1.51 to 1.52.

The cured resin layer 5 constituting the present invention is formed from a resin composition which exhibits characteristics such as those described above. Such a resin composition will be described below.

Figure 3:
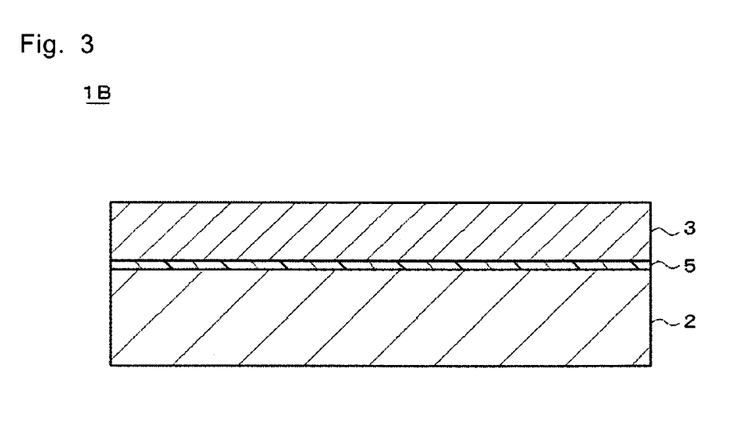
FIG. 3 is a cross-sectional view illustrating the main part of an embodiment of the display device according to the present invention.

The image display device according to the present invention is preferably formed without providing the spacer 4 as in the image display device 1 of the embodiments illustrated in FIGS. 1 and 2, but rather like the image display device 1B illustrated in FIG. 3. The image display device 1B is produced by forming on the image display part 2 a film of the resin composition to provide the cured resin layer 5, laminating the protective part 3 thereon, and then curing the resin composition, thereby eliminating the provision of spacers. In this case, the distance between the image display part 2 and the protective part 3 (i.e., the thickness of the cured resin layer 5), which is determined based on the viscosity and density of the resin composition, the weight of the protective part 3 and the like, is typically in the range of 50 to 250 µm. Such a configuration enables a thinner image display device to be produced.

To produce the image display device 1 of the present invention, the spacer 4 and a not-illustrated ridge are provided on the peripheral part of the image display part 2. A given amount of the resin composition is then dropped onto a region on the inner side of the spacer 4 and the ridge.

The protective part 3 is then placed on the spacer 4 of the image display part 2, and the resin composition is completely filled between the image display part 2 and the protective part 3.

Subsequently, the resin composition is irradiated with heat or energy rays (preferably UV rays) via the protective part 3 to cure the resin composition, whereby the desired image display device 1 is obtained.

When producing the image display device 1B without the spacer 4 as illustrated in FIG. 3, the above-described resin composition may be coated onto the image display part 2, the protective part 3 then placed over the coated resin composition, and heat or energy rays (e.g., UV rays) irradiated from the protective part 3 side.

According to the thus-obtained image display devices 1 and 1B of the present invention, the effects of the stress generated during the resin curing and shrinkage on the image display part 2 and the protective part 3, and the external stress due to warping of the protective part 3 at atmospheric temperatures, can be suppressed to a minimum. Therefore, hardly any distortion is produced in the image display part 2 and the protective part 3. Consequently, since the image display part 2 is not deformed during production, a high-brightness and high-contrast display which is free from image defects can be provided.

In addition, according to the present embodiment, since the cured resin 5 is filled between the image display part 2 and the protective part 3, a thinner image display device 1 can be provided which is strong against shocks.

In particular, when the image display part 2 is a liquid crystal display panel, a liquid crystal display device can be provided which achieves a high-quality display by reliably preventing image defects such as disrupted orientation of the liquid crystal material.

Although the present invention may be preferably applied in the above-described liquid crystal display device, the present invention is not limited thereto. For example, the present invention can also be applied in various panel displays, such as an organic EL device, a plasma display device and the like.

Next, the cured resin layer 5 constituting the image display device 1 according to the present invention is formed from a resin composition capable of providing the above-described characteristics. This curing may be carried out by thermal curing or by energy ray (light such as visible light or UV rays, an electron beam etc.) type curing. However, from the perspective of improving productivity, photocuring is preferred.

More specifically, the resin composition according to the present invention is a resin composition for forming a cured resin layer to be arranged between an image display part of an image display device and a light-transmitting protective part, wherein the cured resin obtained by curing the resin composition has a light transmittance in the visible region of 90% or more for a thickness of 100 µm, an elongation ratio of 700% or more at 25° C. and 400% or more at 80° C., and an adhesive force with respect to an acrylic resin plate of 0.4 N/cm or more at 25° C. and 0.3 N/cm or more at 80° C.

The resin composition according to the present invention has to have a light transmittance in the visible region of 90% or more for a 100 μm-thick cured resin obtained by curing such resin composition. This is because if the light transmittance is less than 90%, the occurrence of discoloration and the deterioration in transparency cannot be ignored in practical use. Concerning the elongation ratio and adhesive force with respect to the acrylic resin plate of the cured resin obtained by curing such resin composition, the above description made regarding the cured resin layer 5 of the image display device 1 according to the present invention may be applied.

The resin composition according to the present invention is prepared so as to have a curing shrinkage ratio of preferably 5% or less, more preferably 4% or less, especially preferably 3% or less, and still more preferably 2.5% or less. Consequently, the internal stress that builds up in the cured resin during curing of the resin composition can be reduced, and the distortion at the interface between the cured resin layer 5 and the image display part 2 or the protective part 3 can be prevented. The curing shrinkage ratio is a value pursuant to the volume shrinkage ratio of JIS K 6901 (item 5.12).

Concerning the storage modulus and/or refractive index of the resin composition according to the present invention, the above description made regarding the cured resin layer 5 of the image display device 1 according to the present invention may preferably be applied.

The cured resin of the resin composition according to the present invention cannot follow the warping if the cohesive force of the cured resin is too small, so that agglomeration destruction occurs. Therefore, the resin composition according to the present invention has a cohesive force of preferably 30 N/cm$^2$ or more at 25° C. and 5 N/cm$^2$ or more at 80° C., and more preferably of 40 to 80 N/cm$^2$ at 25° C. and 10 to 15 N/cm$^2$ at 80° C. This "cohesive force" is a value measured as follows. A strip of a 2 mm-thick PMMA plate and a 1 mm-thick glass substrate are prepared. Then, the resin composition is dropped onto the center of the glass substrate to a diameter of 6 mm. The PMMA substrate is orthogonally placed on the glass substrate via a 0.1 mm spacer. The resin composition is cured by irradiating with UV rays, to thereby produce a test piece. The PMMA substrate of this test piece is fixed. Meanwhile, both ends of the glass substrate not in contact with the PMMA substrate are pressed by a pressing jig (crosshead). The stress required until the PMMA substrate and the glass substrate are separated is measured. The pressing rate is 5 mm/min. The cohesive force is found by dividing the obtained stress by the unit surface area.

The above-described resin composition according to the present invention is, basically, a composition formed from a polymer, a monomer, and a photopolymerization initiator. Concerning the photopolymerization initiator, the protective part 3 is often provided with a function for cutting light in the UV region to protect the image display part 2 against UV rays. Therefore, as the photopolymerization initiator, it is preferred to combine a photopolymerization initiator having the typical sensitivity to UV rays, such as an α-hydroxy ketone, with a photopolymerization initiator which exhibits a curing performance even in the visible region (e.g., diphenyl-(2,4,6-trimethylbenzoyl)phosphine oxide (trade name: SpeedCure TPO, manufactured by Nihon SiberHegner KK).

Preferred examples of the resin composition according to the present invention include resin compositions containing at least one kind of polymer, selected from polyurethane acrylate, a polyisoprene acrylate or an ester thereof, a hydrogenated terpene resin, and a butadiene polymer, at least one kind of acrylate monomer selected from isobornyl acrylate, dicyclopentenyl oxyethyl methacrylate and 2-hydroxybutyl methacrylate, and a photopolymerization initiator.

More specific examples of the resin composition according to the present invention include a resin composition in which the polymer includes an ester compound formed from a maleic anhydride adduct of a polyisoprene polymer and 2-hydroxyethyl methacrylate, a hydrogenated terpene resin, and a butadiene polymer, the monomer includes dicyclopentenyl oxyethyl methacrylate and 2-hydroxybutyl methacrylate, and the photopolymerization initiator includes 1-hydroxycyclohexyl phenyl ketone and diphenyl-(2,4,6-trimethylbenzoyl) phosphine oxide.

An even more specific example of the resin composition according to the present invention is a resin composition containing 50 to 100 parts by mass of the ester compound formed from a maleic anhydride adduct of a polyisoprene polymer and 2-hydroxyethyl methacrylate, 10 to 70 parts by mass of the hydrogenated terpene resin, 30 to 220 parts by mass of the butadiene polymer, 20 to 50 parts by mass of dicyclopentenyl oxyethyl methacrylate, 5 to 15 parts by mass of 2-hydroxybutyl methacrylate, and 1 to 10 parts by mass of 1-hydroxycyclohexyl phenyl ketone, and 1 to 10 parts by mass of diphenyl-(2,4,6-trimethylbenzoyl)phosphine oxide.

The magnitude of the internal stress that builds up in the cured resin during curing of the resin composition according to the present invention can be evaluated based on the average surface roughness of a cured resin obtained by dropping the resin composition onto a flat plate and curing the dropped resin composition. In practice, the distortion generated at the interface between the image display part 2 or the protective part 3 and the resin composition arranged in between can be ignored if, for example, a cured resin obtained by dropping 2 mg of the resin composition onto a glass plate or an acrylic resin plate and curing by UV irradiation to a 90% or more cure ratio has an average surface roughness of 6.0 nm or less. However, with the resin composition of the present invention, this average surface roughness can be kept at 6.0 nm or less, preferably at 5.0 or less, and more preferably in the range of 1 to 3 nm. Preferred examples of the glass plate which may be used include the glass plate which sandwiches the liquid crystals of a liquid crystal cell, or the glass plate used as the protective plate for a liquid crystal cell. Furthermore, preferred examples of an acrylic resin plate which may be used include the acrylic resin plate used as the protective plate for a liquid crystal cell. These glass plates or acrylic resin plates usually have an average surface roughness of 1.0 nm or less.

From the point that the cured resin layer 5 is itself novel, also included in the present invention is a cured resin layer to be arranged between an image display part of an image display device and a light-transmitting protective part, wherein the cured resin layer has a light transmittance in the visible region of 90% or more, an elongation ratio of 700% or more at 25° C. and 400% or more at 80° C., and an adhesive force with respect to an acrylic resin plate of 0.4 N/cm or more at 25° C. and 0.3 N/cm or more at 80° C. The structural elements of this aspect of the invention are as already described above.

EXAMPLES

The present invention will now be described in more detail using the following examples and comparative examples. However, the present invention is not limited to these examples and comparative examples.

Example 1

The resin composition of Example 1 was prepared by kneading in a kneader 55 parts by mass of an ester compound formed from a maleic anhydride adduct of a polyisoprene polymer and 2-hydroxyethyl methacrylate (trade name: UC-203, Kuraray Co., Ltd.), 40 parts by mass of dicyclopentenyl oxyethyl methacrylate (trade name: FA512M, Hitachi Chemical Co., Ltd.), 10 parts by mass of 2-hydroxybutyl methacrylate (trade name: Light Ester HOB, Kyoeisha Chemical Co., Ltd.), 60 parts by mass of a hydrogenated terpene resin having a softening point of 85° C.±5° C. (trade name: Clearon P-85, Yasuhara Chemical Co., Ltd.), 80 parts by mass of a butadiene polymer (trade name: Polyoil 110, Zeon Corporation), 6 parts by mass of a photopolymerization initiator (trade name Irgacure 184D, Ciba Specialty Chemicals Inc.), and 1.5 parts by mass of a photopolymerization initiator (trade name SpeedCure TPO, Nihon SiberHegner KK).

Example 2

The resin composition of Example 2 was prepared in the same manner as in Example 1, except that 40 parts by mass of a hydrogenated terpene resin having a softening point of 115° C.±5° C. (trade name: Clearon P-115, Yasuhara Chemical Co., Ltd.) was used instead of the 60 parts by mass of a hydrogenated terpene resin having a softening point of 85° C.±5° C. (trade name: Clearon P-85, Yasuhara Chemical Co., Ltd.).

Comparative Example 1

The resin composition of Comparative Example 1 was prepared by kneading in a kneader 70 parts by mass of an ester compound formed from a maleic anhydride adduct of a polyisoprene polymer and 2-hydroxyethyl methacrylate (trade name: UC-203, Kuraray Co., Ltd.), 30 parts by mass of dicyclopentenyl oxyethyl methacrylate (trade name: FA512M, Hitachi Chemical Co., Ltd.), 10 parts by mass of 2-hydroxybutyl methacrylate (trade name: Light Ester HOB, Kyoeisha Chemical Co., Ltd.), 30 parts by mass of a hydrogenated terpene resin having a softening point of 85° C.±5° C. (trade name: Clearon P-85, Yasuhara Chemical Co., Ltd.), 140 parts by mass of a butadiene polymer (trade name: Polyoil 110, Zeon Corporation), 2 parts by mass of a photopolymerization initiator (trade name Irgacure 184D, Ciba Specialty Chemicals Inc.), and 7 parts by mass of a photopolymerization initiator (trade name SpeedCure TPO, Nihon SiberHegner KK).

Example 3

The resin composition of Example 3 was prepared in the same manner as in Example 1, except that the 60 parts by mass of the hydrogenated terpene resin having a softening point of 85° C.±5° C. (trade name: Clearon P-85, Yasuhara Chemical Co., Ltd.) was changed to 15 parts by mass.

Each of the resin compositions prepared in Examples 1 to 3 and Comparative Example 1 was dropped onto a 100 μm-thick white acrylic resin plate to a predetermined thickness. The plates were transported on a UV-conveyor to obtain cured resins having a predetermined thickness. The cured resins were used as samples.

(Evaluation 1)

The light transmittance, elongation ratio, adhesive force with respect to a protective plate, storage modulus, curing shrinkage ratio, cohesive force, and average surface roughness of each sample were determined as described below.

[Light Transmittance]

Using a UV-Visible Spectrophotometer (V-560, JASCO Corporation), each sample (cured resin thickness of 100 μm) was analyzed for the light transmittance in the visible range. All of the samples had a 90% or more light transmittance.

[Elongation Ratio]

The elongation ratio is a value obtained by producing a sample and measuring with a tension tester (Tensilon, manufactured by Orientech Co., Ltd.). This sample is produced by dropping the resin composition onto a release film to a given thickness, irradiating the resin composition with UV rays to cure, and then cutting into a given size (for example, 0.6 mm thick, 10 mm wide, 25 mm long). The conditions are an atmosphere temperature of 25° C. or 80° C., a weight of 5 Kgf, and a rate of pulling of 5 mm/min. The elongation ratio is calculated as elongation ratio (%)=L/L0×100, where L0 is a standard length and L is a displacement length until breakage.

[Adhesive Force with Respect to Protective Plate (JIS K 6854-1)]

The resin composition is coated onto a PET film to a thickness of 50 μm, and the resultant coated film is laminated on a PMMA plate, and then irradiated with UV rays to cure, whereby a test piece (width 2.5 cm) is produced. Next, the cured resin composition product is peeled off from the PMMA plate along with the PET film in a 90° direction at a rate of 50 mm/min using a tension tester (Tensilon, manufactured by Orientech Co., Ltd.) at an atmosphere temperature of 25° C. or 80° C. A value obtained by dividing the force required for this peeling by 2.5 cm is taken as the adhesive force.

[Storage Modulus]

Using a viscoelastometer (DMS6100, Seiko Instruments Inc.), the storage modulus (Pa) (25° C.) of each sample was measured at a frequency of 1 Hz. The obtained results are shown in Table 1.

[Curing Shrinkage Ratio]

The curing shrinkage ratio (%) of each sample was determined by the following equation using the difference in the specific gravities between the uncured resin solution and the cured solid product, as measured by an electronic densimeter (SD-120L, Mirage). The obtained results are shown in Table 1.

Curing shrinkage ratio (%)=(Cured product specific gravity−Resin solution specific gravity)/Cured product specific gravity×100

[Cohesive Force]

A strip of a 2 mm-thick PMMA plate and a 1 mm-thick glass substrate are prepared. Then, the resin composition is dropped onto the center of the glass substrate to a diameter of 6 mm. The PMMA substrate is orthogonally placed on the glass substrate via a 0.1 mm spacer, to thereby produce a test piece. The PMMA substrate of this test piece is fixed. Meanwhile, both ends of the glass substrate not in contact with the PMMA substrate are pressed by a pressing jig (crosshead). The stress required until the PMMA substrate and the glass substrate are separated is measured at an atmosphere temperature of 25° C. or 80° C. The pressing rate is 5 mm/min. The cohesive force is found by dividing the obtained stress by the unit surface area.

[Average Surface Roughness Measurement]

2 mg of each resin composition was dropped onto a glass plate for a liquid crystal cell. The distortion (Ra: average surface roughness) in a given region (2.93 mm×2.20 mm) of a glass plate surface formed by the internal stress generated during UV curing was measured using a three-dimensional non-contact surface roughness meter manufactured by Zygo Corporation. The obtained results are shown in Table 1.

TABLE 1

| Component (parts by mass) | | Example 1 | Example 2 | Comparative Example 1 | Example 3 |
|---|---|---|---|---|---|
| UC-203 | | 55 | 55 | 70 | 55 |
| FA512M | | 40 | 40 | 30 | 40 |
| Light Ester HOB | | 10 | 10 | 10 | 10 |
| Clearon P-85 | | 60 | — | 30 | 15 |
| Clearon P-115 | | — | 40 | — | — |
| Polyoil 110 | | 80 | 80 | 140 | 80 |
| Irgacure 184D | | 6 | 6 | 2 | 6 |
| Speedcure TPO | | 1.5 | 1.5 | 7 | 1.5 |
| Elongation ratio (%) | 25° C. | 800 | 1000 | 600 | 1000 |
| | 80° C. | 550 | 500 | 300 | 550 |
| Adhesive Force (N/cm) | 25° C. | 0.65 | 0.6 | 0.3 | 0.6 |
| | 80° C. | 0.5 | 0.44 | 0.2 | 0.4 |
| Storage Modulus (Pa) | 25° C. | $3.5 \times 10^3$ | $3.5 \times 10^3$ | $1.0 \times 10^4$ | $1.0 \times 10^4$ |
| Curing Shrinkage Ratio (%) | | 1.3 | 2.1 | 1.8 | 2.9 |
| Cohesive Force (N/cm$^2$) | 25° C. | 35.0 | 30.0 | 20.0 | 30.0 |
| | 80° C. | 5.0 | 9.0 | 3.0 | 5.0 |
| Average Surface Roughness (nm) | | ≦1 | ≦1 | ≦1 | ≦1 |

As is clear from Table 1, Examples 1 to 3 obtained good results, with an elongation ratio of 700% or more at 25° C. and 400% or more at 80° C., an adhesive force with respect to the protective part of 0.4 N/cm or more at 25° C. and 0.3 N/cm or more at 80° C., and hardly any distortion. In Example 3, since the curing shrinkage ratio was slightly higher than in Examples 1 and 2, a slight amount of display unevenness was observed. However, this observed display unevenness was at a level which would not be a problem in practical use.

In contrast, in Comparative Example 1, the elongation ratio and adhesive force with respect to the protective part were both insufficient.

(Evaluation 2)

Next, a panel sample was produced using the resin composition of the above-described examples and comparative example for impact resistance evaluation. More specifically, the resin composition of Example 1 or 2 was cured between a 50 mm×50 mm×0.5 mm (thickness) glass plate (image display part) and a 50 mm×50 mm×0.5 mm (thickness) polymethacrylate plate (protective part) to form a 0.1 mm-thick layer between the two plates. The resulting panel served as an Example sample panel. In this case, a spacer was not used, and the sample panel had a total thickness of 1.1 mm. To produce the sample panel, the resin composition of Example 1 or 2 was coated on the glass plate and the polymethacrylate plate was placed over the coated resin composition. The resin composition was then cured by UV irradiation from the polymethacrylate plate side.

Meanwhile, a sample panel according to the conventional technique illustrated in FIG. 4 was produced. The same parts as used to make the Example sample panel were used for the liquid crystal display panel (image display part) 102 and the protective part 103. A 1.0 mm-thick spacer was arranged between the image display part and the protective part to produce a panel with a 1.0 mm air gap and a total thickness of 2.0 mm. This panel served as the Comparative Example sample panel.

The Example sample panel and the Comparative Example sample panel were fixed along their periphery using a given jig. A panel breakage test was then performed by pressing a pressing member having a diameter of 5 mm, perpendicularly against the surface of the protective part at a press speed of 1 mm/sec.

From these results, it could be confirmed that according to the Example panel, despite the fact that the panel was thinner than the Comparative Example panel, the pressing strength improved by 150%.

Industrial Applicability

The present invention is useful in an image display device such as a liquid crystal display device and the like.

The invention claimed is:

1. An image display device, comprising an image display part and a light-transmitting protective part arranged on the image display part, wherein
the image display device further comprises a cured resin layer arranged between the image display part and the protective part, and
the cured resin layer has a light transmittance in a visible region of 90% or more, an elongation ratio of 700% or more at 25° C. and 400% or more at 80° C., and an adhesive force with respect to the protective part of 0.4 N/cm or more at 25° C. and 0.3 N/cm or more at 80° C.

2. The image display device according to claim 1, wherein the elongation ratio of the cured resin layer is 800% or more at 25° C. and 500% or more at 80° C., and the adhesive force with respect to the protective part is 0.5 N/cm or more at 25° C. and 0.4 N/cm or more at 80° C.

3. The image display device according to claim 2, wherein a storage modulus at 25° C. of the cured resin layer is from $1 \times 10^3$ to $1 \times 10^5$ Pa.

4. The image display device according to claim 1, wherein the protective part is made of an acrylic resin plate.

5. The image display device according to claim 4, wherein a storage modulus at 25° C. of the cured resin layer is from $1 \times 10^3$ to $1 \times 10^5$ Pa.

6. The image display device according to claim 1, wherein a storage modulus at 25° C. of the cured resin layer is from $1 \times 10^3$ to $1 \times 10^6$ Pa.

7. The image display device according to claim 1, wherein the cured resin layer has a thickness of 50 to 250 μm.

8. The image display device according to claim 1, wherein the image display part is a liquid crystal display panel.

9. The image display device according to claim 1, wherein a storage modulus at 25° C. of the cured resin layer is from $1 \times 10^3$ to $1 \times 10^5$ Pa.

10. A resin composition for forming a cured resin layer to be arranged between an image display part and a light-transmitting protective part of an image display device, wherein a cured resin layer obtained by curing the resin composition has a light transmittance in a visible region of 90% or more for a thickness of 100 μm, an elongation ratio of 700% or more at 25° C. and 400% or more at 80° C., and an adhesive force with respect to an acrylic resin plate of 0.4 N/cm or more at 25° C. and 0.3 N/cm or more at 80° C.

11. The resin composition according to claim 10, wherein the cured resin layer has an elongation ratio of 800% or more at 25° C. and 500% or more at 80° C., and an adhesive force with respect to the acrylic resin plate of 0.5 N/cm or more at 25° C. and 0.4 N/cm or more at 80° C.

12. The resin composition according to claim 10, having a curing shrinkage ratio of 4.0% or less.

13. The resin composition according to claim 10, having a curing shrinkage ratio of 3.0% or less.

14. The resin composition according to claim 10, having a curing shrinkage ratio of 2.5% or less.

15. The resin composition according to claim 10, wherein a storage modulus at 25° C. of the cured resin of the resin composition is from $1 \times 10^3$ to $1 \times 10^6$ Pa.

16. The resin composition according to claim 10, containing one kind of polymer selected from the group consisting of a polyurethane acrylate, a polyisoprene acrylate or an ester thereof, a hydrogenated terpene resin, and a butadiene polymer; at least one kind of acrylate monomer selected from the group consisting of isobornyl acrylate, dicyclopentenyloxyethyl methacrylate and 2-hydroxybutyl methacrylate; and a photopolymerization initiator.

17. The resin composition according to claim 16, wherein the polymer includes an ester compound formed from a maleic anhydride adduct of a polyisoprene polymer and 2-hydroxyethyl methacrylate, a hydrogenated terpene resin, and a butadiene polymer, the monomer includes dicyclopentenyl oxyethyl methacrylate and 2-hydroxybutyl methacrylate, and the photopolymerization initiator includes 1-hydroxycyclohexyl phenyl ketone and diphenyl-(2,4,6-trimethylbenzoyl) phosphine oxide.

18. The resin composition according to claim 10, wherein a cured resin obtained by dropping 2 mg of the resin composition onto a glass plate or an acrylic resin plate and curing by UV irradiation has an average surface roughness of 6.0 nm or less.

19. The resin composition according to claim 10, wherein a cured resin obtained by dropping 2 mg of the resin composition onto a glass plate or an acrylic resin plate and curing by UV irradiation has an average surface roughness of 5.0 nm or less.

20. A cured resin layer to be arranged between an image display part and a light-transmitting protective part of an image display device, the cured resin layer having a light transmittance in a visible region of 90% or more, an elongation ratio of 700% or more at 25° C. and 400% or more at 80° C., and an adhesive force with respect to an acrylic resin plate of 0.4 N/cm or more at 25° C. and 0.3 N/cm or more at 80° C.

* * * * *